Aug. 17, 1954 W. P. OEHLER 2,686,686

SWIVEL JOINT

Original Filed Sept. 4, 1947 2 Sheets-Sheet 1

INVENTOR.
WILLIAM P. OEHLER

BY R C Johnson and A W Keith

ATTORNEYS

INVENTOR.
WILLIAM P. OEHLER
BY R. C. Johnson and Kleinkopf
ATTORNEYS

Patented Aug. 17, 1954

2,686,686

UNITED STATES PATENT OFFICE 2,686,686

SWIVEL JOINT

William P. Oehler, Moline, Ill., assignor to Deere & Company, Moline, Ill., a corporation of Illinois Original application September 4, 1947, Serial No. 772,069. Divided and this application March 11, 1949, Serial No. 80,936

2 Claims. (Cl. 287—91)

This application is a division of my co-pending application (A-1937), Serial No. 772,069, filed September 4, 1947, for Disk Harrow, Patent No. 2,644,388.

The present invention relates generally to disk harrows and more particularly to the disk gang units of such implements and the bearing constructions incorporated in or associated with the disk gangs.

The object and general nature of the present invention is the provision of a new and improved bearing construction for the disk gangs of disk harrows and the like particularly a disk gang bearing wherein means is provided for pivotally connecting the bearing with an associated frame and new and improved bearing clamping means whereby the two portions of the bearing, which is usually of split construction, are held together without danger of loosening in operation, while accommodating pivotal action between the disk gang and the frame to which it is connected. Specifically, the present invention is directed to the provision of new and improved means for connecting the main frame of the disk harrow to the frame-receiving yoke of the bearing so as to accommodate, in addition to the aforesaid pivotal movement, pivotal movement of the gang in a horizontal direction relative to the main frame. Still further, it is a feature of this invention to provide new and improved means for holding the main frame in operative connection with the associated bearing yoke accommodating the aforesaid pivoting action.

These and other objects and advantages of the present invention will be apparent to those skilled in the art after a consideration of the following detailed description, taken in conjunction with the accompanying drawings, in which.

Figures 1, 2, 3:
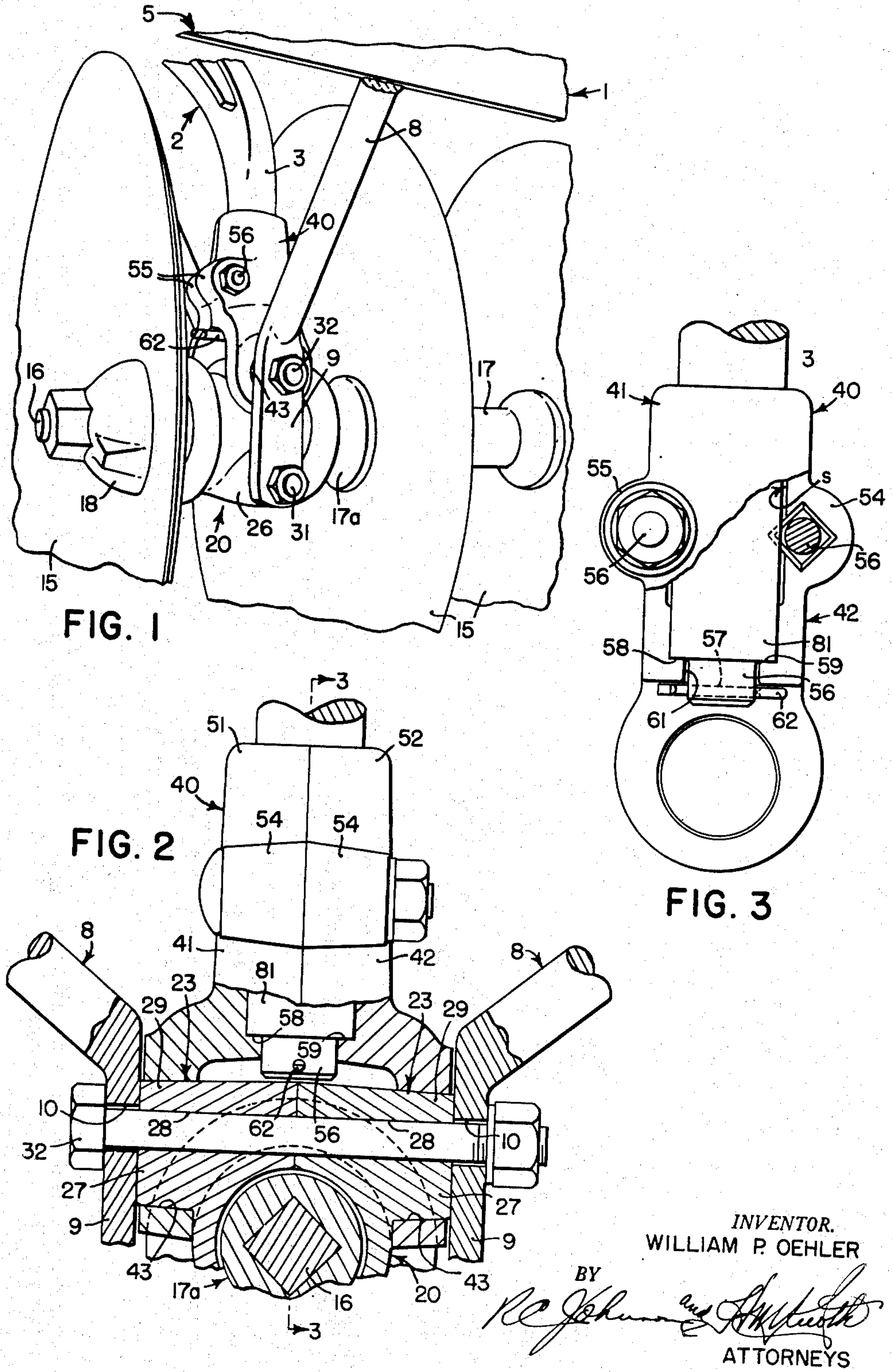
Figure 1 is a fragmentary perspective view of a disk harrow in which the principles of the present invention have been incorporated.
Figure 2 is a transverse sectional view showing my new and improved bearing construction and frame connection.
Figure 3 is a sectional view taken generally along the line 3—3 of Figure 2.

Referring now to the drawings, the disk harrow in which the principles of the present invention have been incorporated is indicated in its entirety by the reference numeral 1 and is preferably of the type of implement shown in the United States Patent 2,339,124, issued January 11, 1944 to Charles H. White to which reference may be had if necessary. Briefly, the disk harrow 1 comprises a pair of front disk gangs and a pair of rear disk gangs, each gang including its own gang frame and each gang being pivotally connected at its inner ends to a frame standard forming a part of a main frame. The frame of the harrow is indicated in its entirety by the reference numeral 2 and is generally of approximately rectangular construction having at each corner thereof a depending frame standard 3. Each of the gang frames is indicated in its entirety by the reference numeral 5 and comprises a framework made up preferably of an angle member or members, and at each end each gang frame 5 has a pair of gang frame standards 8 extending generally downwardly in converging relation and terminating at their lower ends in approximately parallel flattened sections 9 having vertically spaced bolt-receiving openings 10. Each disk gang includes, in addition to the frame 5 and associated parts described above, a plurality of disks 15 mounted on a gang bolt 16 and held in spaced apart relation by a plurality of spools 17 disposed between adjacent disks. The head of the gang bolt 16 is normally disposed at the outer end of each gang and at its inner end the gang bolt is threaded to receive a nut member 18. At each end of each of the disk gangs the bearing spool, indicated at 17a, serves as a journal member to receive an associated bearing construction, indicated in its entirety by the reference numeral 20. The bearing constructions at the inner and outer ends of each gang are substantially identical, except that the inner bearing construction provides for pivotal connection of the associated main frame standard 3 thereto, and is disclosed and claimed in my parent application mentioned above. Hence, only a brief description of the gang bearing will suffice.

Each laterally inner bearing comprises a bearing sleeve made up of a pair of mating bearing sections 23 adapted to embrace and have bearing engagement with the outer surface of the associated gang journal member 17a. Centrally, each of the bearing sleeve sections 23 is formed with apertured bolt-receiving extensions 26 and 27, the apertures in each being indicated by the reference numeral 28. A pair of clamping bolts 31 and 32 are inserted through the registering openings 28 for the purpose of clamping the two halves 23 of the bearing sleeve together so as to form a complete bearing, encircling the associated journal member 17*a*. The bolts 31 and 32 also extend through the openings 10 in the lower portions of the associated gang frame standards 8, the flattened sections 9 of said standards lying substantially flat against the end portions of the extensions 26 and 27 on the bearing sleeve sections and are held rigidly thereagainst by tightening the nuts on the bolts 31 and 32.

A yoke member 40 is mounted on each inner bearing construction and preferably comprises a pair of mating yoke sections 41 and 42, the lower portions of which are apertured, as at 43, and offset laterally so that when the parts are assembled the yoke member 40 includes a lower bifurcated portion that is adapted to embrace the upper part of the associated bearing sleeve. The apertures 43 in the lower laterally offset portions of the yoke sections 41 and 42 are adapted to be rockably mounted on the associated bosses 29 formed on the two halves of the bearing sleeve 23, 23.

The upper portions 51 and 52 of the yoke sections 41 and 42 are generally semi-cylindrical so that when the parts are assembled on the associated bearing an upwardly extending, generally vertically disposed frame standard-receiving socket *s* is provided. Each yoke section 41 and 42, is provided with a pair of laterally disposed apertured ears 54 and 55 to receive a pair of clamping bolts 56 which hold the two halves of the yoke member 40 together. In one form of the present invention the lower end 81 of the associated frame standard 3 is reduced, as indicated by the reference numeral 56, and provided with a through aperture 57, thereby providing a downwardly facing shouldered section 58 which rests against a corresponding shouldered portion 59 formed on the lower portions of the yoke sections 41 and 42, at the lower end of the socket *s*. An opening 61 receives the extension 56, and the latter extends downwardly through the opening 61 into the open portion of the yoke which lies above the upper parts of the bearing sections 23 and between the two laterally offset portions of the yoke, as best shown in Figure 2. A cotter key or other pin, as indicated at 62, is inserted through the hole 57 and when in place serves to retain the frame standard 3 in place in the associated socket *s*, fitting snugly within the latter but with sufficient freedom to permit the associated disk gang to swing about a generally vertical axis relative to the main frame, the pin 62 swinging around in the above mentioned open portion of the yoke 40. The disk gang is also capable of swinging about a generally horizontal axis, as defined by the bosses 29, relative to the main frame 2.

Figure 4:
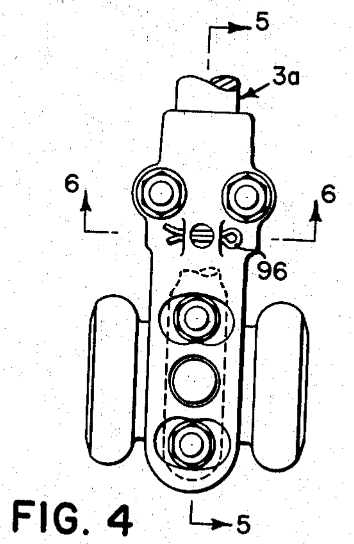
Figure 4 is a side view of another form of bearing construction in which the principles of the present invention have been incorporated.
Figure 6:
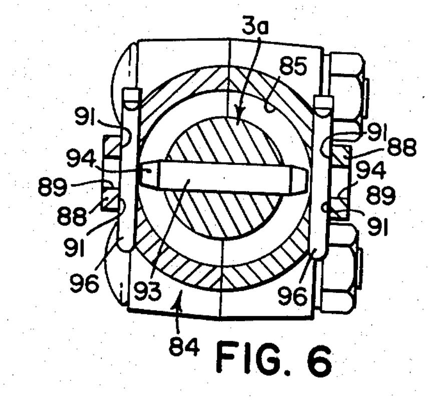
Figure 6 is a sectional view taken generally along the line 6—6 of Figure 5.
Figure 5:
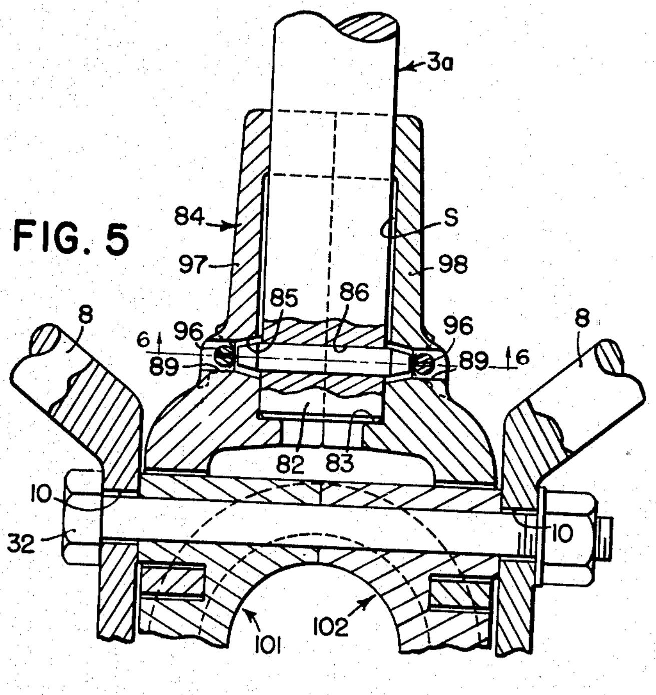
Figure 5 is a sectional view taken generally along the line 5—5 of Figure 4.

A modified form of connection between the main frame and the inner bearing construction is shown in Figure 4. Referring now to this figure, it will be seen that the lower end 82 of the frame extension or standard 3*a* is without any reduced extension. This eliminates the requirement and expense of forging a reduced end, as shown at 56 in Figure 2. The lower end 82 is adapted to rest against shoulders 83 formed on the yoke sections of the associated yoke member 84. The upper portions of the latter form a socket S receiving the frame extension 3*a*, and the yoke sections are provided interiorly with an open portion in the form of an annular groove 85 which registers with an opening 86 formed in the frame extension or standard 3*a*. In this form of the invention each of the yoke sections is provided with a boss 88 having a radial pin-receiving opening 89 and transverse openings 91 intersecting the opening 89. When the frame in this form of the invention is to be assembled onto the associated yoke members, each extension 3*a* is seated in the associated socket S. A pin 93, which may have tapered ends 94, is inserted through one of the yoke section openings 89 and with a small pin, punch or the like, pushed into the frame extension opening 86 to such position that the ends 94 are free to move around in the open portion or annular groove 85. A cotter pin or other suitable element 96 is then inserted in the openings 91 in each yoke member. As best shown in Figure 6, these two cotters prevent either end of the pin 93 from entering either of the yoke openings 89. Thus, the yoke member 84 is free to turn on the lower end of the frame extension 3*a* about a generally vertical axis without interference, yet when it is desired to disassemble the parts, it is a simple matter to take out both of the cotters 96, turn the yoke relative to the frame member 3*a* so as to have the pin 93 register with the openings 89, and then with a suitable tool remove the pin 93 from the opening 86 in the frame standard 3*a*, whereupon the latter may be removed from the socket S in the yoke member. Like the yoke member 40 described above, the yoke member 84 is formd as two mating sections 97 and 98, the lower portions of which pivotally receive the two associated mating bearing sections 101 and 102.

While I have shown and described above the preferred structure in which the principles of the present invention have been employed, it is to be understood that my invention is not to be limited to the exact details shown and described above, but that, in fact, widely different means may be employed in the practice of the broader aspects of my invention.

What I claim, therefore, and desire to secure by Letters Patent is:

1. For use with a disk horrow or the like, the combination of a main frame having a generally downwardly extending standard formed with a transverse opening through the lower end portion thereof, a yoke member having an upwardly facing socket portion receiving said standard and having a lower shouldered portion against which the lower portion of said standard has bearing support, said yoke member having an annular groove formed in the lower portions of said socket portion, a transverse pin detachably carried in the transverse opening in the lower end portion of said standard, said pin having a length such that the end of said pin moves around in said groove when said standard is rotated in said socket portion, there being a pair of oppositely disposed transverse openings at each side of said socket portion, said latter openings intersecting said annular groove in substantially tangential relation with respect to the bottom of the groove, and retaining pin means disposed in said transverse openings with the inner portions of said pins lying in tangential relationship with respect to the bottom of the groove and thereby in a position to contact the ends of said transverse pin for holding the ends of the latter in said groove during rotation of the standard relative to said socket portion.

2. For use with a disk harrow or the like of the type including a main frame having a generally downwardly extending standard, and a bearing-receiving yoke having an upwardly extending socket portion receiving said main frame standard, the improvement comprising an annular groove formed in said socket portion and a pair of oppositely disposed holes leading from the exterior into said groove, and an opening formed in said frame standard, a pin insertable through one of the openings in said socket portion into the opening in said frame standard, said pin being located in said opening and having its ends movable in said groove, transversely apertured sections on the yoke on opposite sides of each of said holes, and pin-holding means disposed in said apertured sections for holding said pin in the opening in said standard, said apertured sections being so constructed and arranged whereby each of said pin-holding means lies substantially tangent to the radially outer portions of said annular groove.

References Cited in the file of this patent

UNITED STATES PATENTS

| Number | Name | Date |
|---|---|---|
| 824,526 | Coffin | June 26, 1906 |
| 1,006,316 | Turner et al. | Oct. 17, 1911 |
| 1,157,080 | Bucknam | Oct. 19, 1915 |
| 1,176,662 | Dickinson | Mar. 21, 1916 |
| 1,234,986 | Weileder | July 31, 1917 |
| 1,442,223 | Knebusch | Jan. 16, 1923 |
| 1,805,392 | Douds | May 12, 1931 |
| 2,394,276 | Venditty | Feb. 5, 1946 |